United States Patent [19]
Goellner

[11] 3,720,223
[45] March 13, 1973

[54] SEAL CONSTRUCTION FOR STEAM TRAPS

[75] Inventor: Allan R. Goellner, Parma Heights, Ohio

[73] Assignee: The Clark-Reliance Corp., Cleveland, Ohio

[22] Filed: April 12, 1971

[21] Appl. No.: 133,201

[52] U.S. Cl. .................137/183, 277/112, 277/171
[51] Int. Cl. .................................................F16t 1/16
[58] Field of Search .......137/183; 251/263; 285/342; 277/112, 171, 170

[56] References Cited

UNITED STATES PATENTS

| | | | |
|---|---|---|---|
| 3,073,566 | 1/1963 | Bredtschneider | 251/363 X |
| 3,075,793 | 1/1963 | Lennon | 285/342 |
| 2,951,496 | 9/1960 | Yarnall | 137/183 |

*Primary Examiner*—Alan Cohan
*Attorney*—Bosworth, Sessions, Herrstrom & Cain

[57] ABSTRACT

A steam trap having an improved means for sealing a control chamber within the body of the trap, particularly with respect to the inlet and outlet passages. The body of the trap has a bore with a threaded counterbore and the bore receives a cylindrical valve seat element. A beveled annular shoulder is formed between the bore and the counterbore and an adjacent beveled annular shoulder is formed in the seat so that the two shoulders together form a V-shaped annular groove that receives a radially expansible annular metal sealing gasket with a convexly curved bottom surface. The bottom surface of the gasket bears initially, when unflexed, against only the shoulder in the seating element. However, when the gasket is forced downward and outward during assembly of the trap, it is rolled and radially expanded into continuous sealing engagement with the shoulder formed between the bore and counterbore as well as with the shoulder of the valve seat element.

6 Claims, 4 Drawing Figures

INVENTOR.
ALLAN R. GOELLNER
BY Bosworth, Sessions,
Herrstrom & Cain
ATTORNEYS

SEAL CONSTRUCTION FOR STEAM TRAPS

BACKGROUND OF THE INVENTION

This invention relates to steam traps for removing accumulations of condensate from steam systems, and especially to automatic steam traps such as the type disclosed in U.S. Pat. Nos. 2,951,496 and 3,150,677. More particularly the invention relates to an improved means for sealing the component parts of the trap when in assembled relation so as to seal the control chamber and particularly to prevent leakage of steam between the control chamber and the outlet or the atmosphere. Such leakage causes the trap to cycle rapidly and permits discharge of steam instead of condensate.

Steam traps of the type to which the invention has particular utility use a floating disc for example located in a control chamber, to open and close the inlet and outlet passages of the trap. The floating disc is adapted to contact valve seats in the control chamber to shut off the flow of fluid into the control chamber from a steam inlet port and out of the control chamber through an outlet port for condensate and air. The force exerted against the disc by the fluid in the control chamber determines whether or not the disc is in contact with the seats adjacent the ports or spaced therefrom. When air and condensate are passing through the trap the sealing disc is pushed away from the seating surfaces by the force of the fluid in the system bearing against the sealing disc. This condition permits the free flow of condensate through the trap. When substantially all of the condensate has passed through the trap, steam tends to accumulate in the control chamber behind the disc until its pressure causes a resultant force sufficient to cause the disc to move into contact with seats of the inlet and outlet ports.

U.S. Pat. No. 3,150,677 discloses a steam trap of an especially advantageous design. As shown and described therein the body of the trap is provided with an inlet and outlet as well as a bore with a threaded counterbore. The bore receives a cylindrical seating element with ports therethrough that register with the inlet and outlet passages respectively formed in the body of the trap. The outlet port of the seating element extends through the side thereof and the inlet port extends axially through the bottom.

The threaded counterbore of the above prior art device receives a cap with a threaded tubular shaft that defines with the top surface of the seating element, a cylindrical control chamber. The floating disc is located within the control chamber in a position to be seated when closed against the top of the seating element to close and seal both the inlet and outlet ports.

The seating element is sealed in position to prevent leakage between the inlet and outlet passages by means of a flat annular metal gasket located between the floor of the bore and the bottom surface of the seating element. The control chamber is sealed within the body and also with respect to the inlet and outlet passages by means of another flat annular metal gasket positioned between the bottom edge of the cap and a carefully machined annular seat between the bore and the counterbore. The inner part of the gasket also seats against a carefully machined annular seat formed in the top surface of the seating element at exactly the level of the seat between the bore and counterbore.

It is apparent that in order to achieve a tight seal the surfaces of the respective annular seats must be machined to within very close tolerances. Even a slight variation could result in leakage to or from the valve chamber that would seriously impair the performance of the trap. The accuracy required results in costly machining operations in the manufacture of the trap and also makes the trap vulnerable to excessive leakage or failure in the event that proper tolerances are not maintained.

The construction and assembly of the various components of the trap of the present invention however reduce the difficulties indicated above and afford other features and advantages not obtainable from the prior art.

SUMMARY OF THE INVENTION

It is among the objects of the invention to improve the seals between the component parts of a steam trap of the type generally described above.

A more specific object is to provide an improved means to seal a control chamber for a floating disc type steam trap within the trap body and especially with respect to the inlet and outlet passages.

Another object of the invention is to provide an automatic steam trap that may be assembled with improved efficiency and manufactured at relatively low cost.

These and other objects and advantages are accomplished by means of a floating disc type steam trap having a general construction as described above and wherein the body of the trap is provided with a beveled annular shoulder between the bore and the counterbore and an oppositely beveled annular shoulder formed adjacent the top of the seating element with the shoulder on the body being slightly below the shoulder on the seating element so that when the trap is assembled, the shoulders define an annular v-shaped groove with the legs of the V slightly offset from each other. An annular radially expansible gasket having a convexly curved bottom surface is positioned in the groove and has a diameter when in its unexpanded or relaxed condition such that the convexly curved bottom surface rests against the beveled shoulder of the seating element. When a cap is tightened down in the threaded counterbore during assembly of the trap, the gasket is radially expanded and rolled about its line of engagement with the shoulder of the seating element until it is forced into sealing registration with the beveled shoulder between the bore and the counterbore thus providing one continuous annular seal line between the gasket and the seat and another continuous annular seal line between the gasket and the body of the trap. The annular bottom edge of the cap according to the preferred embodiment is provided with a convexly curved bottom edge to provide a continuous seal between the cap and the top surface of the expansible metal gasket. With this arrangement the control chamber and the inlet and outlet passages are tightly sealed without a need for machining gasket seats to extremely close tolerances.

DESCRIPTION OF THE PREFERRED EMBODIMENT

Figure 1:
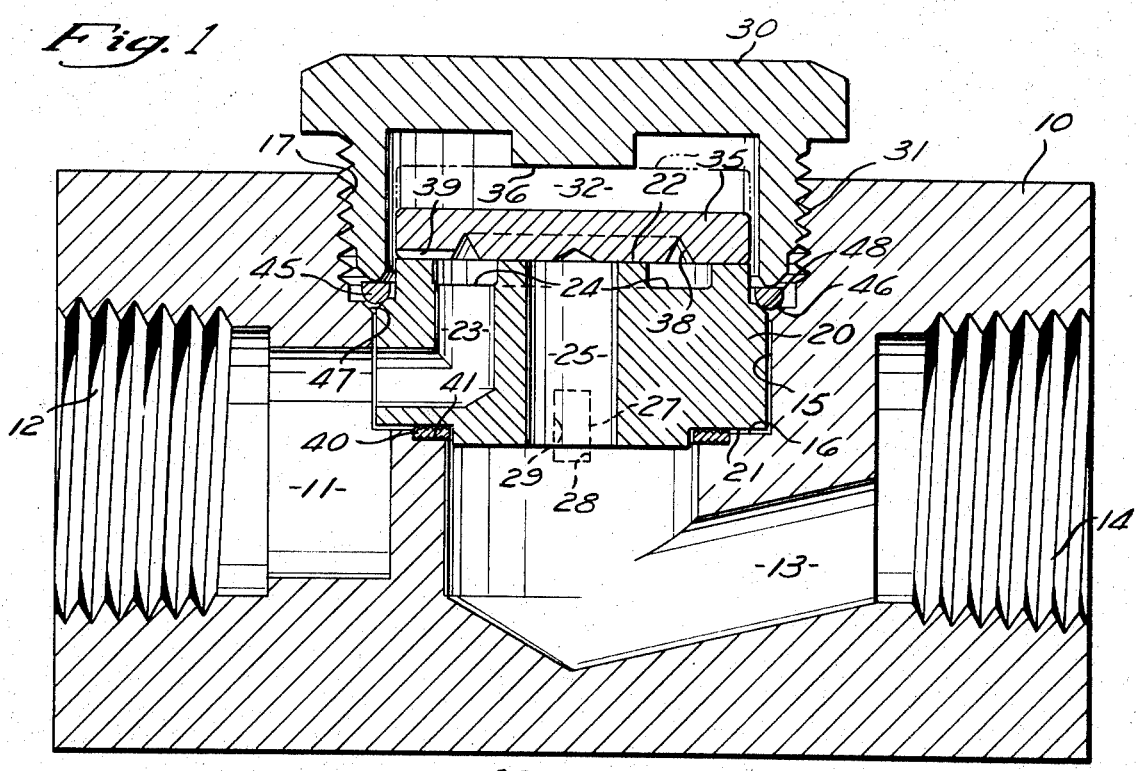
FIG. 1 is a vertical section through a floating disc type steam trap embodying the invention.
Figure 4:
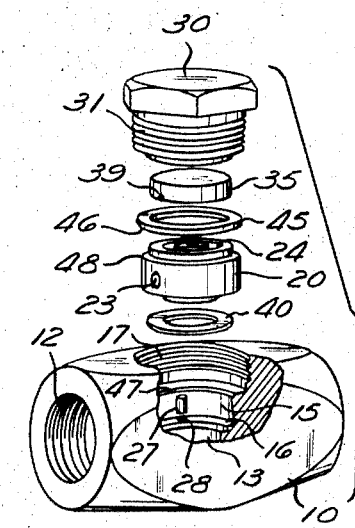
FIG. 4 is an exploded perspective view showing the component parts of the steam trap of FIGS. 1 to 3.

Referring more particularly to the drawings and initially to FIGS. 1 and 4, there is shown a floating disc type steam trap including a trap body 10 preferably formed of steel, with an outlet passage 11 communicating with a threaded receptacle 12 for an outlet fitting (not shown), and an inlet passage 13 communicating with a threaded receptacle 14 for an inlet fitting (not shown). Also formed in the body 10 between the passages 11 and 13 is a bore 15 with a floor 16 and a threaded counterbore 17. The outlet passage 11 terminates in the side of the bore 15 while the inlet passage 13 terminates in the center of the floor 16.

A cylindrical seating element 20 is received within the bore 15 with its bottom surface 21 adjacent the floor 16 and its top surface 22 located within the threaded counterbore 17. The seating element 20 has an outlet port 23 formed therein that communicates with the outlet passage 11 in the body 10, at one end and terminates at the other end in an annular groove 24 formed in the top surface 22. The seating element 20 also has an axial inlet port 25 that communicates with the inlet passage 13 in the trap body 10 and terminates in the center of the top surface 22. The seating element 20 is positioned in the bore 15 with its outlet port 23 in proper registration with the outlet passage 11 by means of a positioning pin 27 that has its lower end received in a small bore 28 formed in the floor 16 of the bore 15 and its upper end received in a bore 29 formed in the bottom of the seating element 20.

A cap 30 having a hollow threaded shaft 31 is received in the threaded counterbore 17 and defines with the top surface 22 of the seating element 20, a control chamber 32. Located within the control chamber 32 is a floating disc 35 which is movable between a seated position shown in solid lines in FIG. 1 wherein it seals the annular groove 24 and the outlet passage 23, and an open position wherein it bears against a stop 36 in the top of the control chamber 32. The bottom surface of the disc 35 has an annular groove 38 that is located directly over the annular groove 24 in the seating element 20 and a small leakage duct 39 is formed between the annular groove 38 and the control chamber 32 for a purpose described in detail in U.S. Pat. No. 3,150,677. The seating element 20, cap 30 and disc 35 are preferably formed of high carbon steel or stainless steel.

A seal is provided between the bottom surface 21 of the seating element 20 and the floor 16 of the bore 15 by means of a flat annular gasket 40 with annular grooves, positioned in an annular seat 41 formed in the floor 16. The gasket 40 prevents steam from leaking around the seating element 20 to the outlet passage 11 from the inlet passage 13 and port 25 of the trap body 10 and seating element 20 respectively.

The control chamber is sealed with respect to the seating element 20 and the trap body 10 by means of a radially expansible annular sealing gasket 45 formed of annealed stainless steel or "MONEL" metal and having a convexly curved bottom surface 46. The gasket 45 is received in a V-shaped annular groove with one side wall formed by a beveled annular shoulder 47 between the bore 15 and counterbore 17 of the trap body 10 and its other side wall formed by an oppositely beveled annular shoulder 48 formed just adjacent the top surface 22 of the seating element 20. As shown in the drawing, the beveled shoulder 47 is slightly below the beveled shoulder 48, so that the legs of the V are slightly offset from one another.

Figures 2, 3:
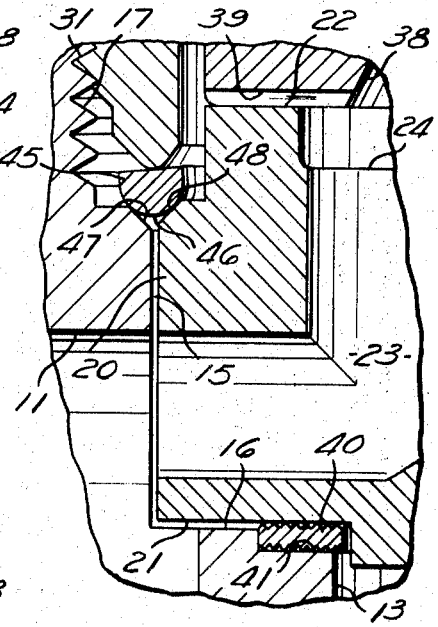
FIG. 2 is a fragmentary sectional view similar to FIG. 1 but on an enlarged scale.
FIG. 3 is a fragmentary sectional view similar to FIG. 2 but showing the annular radially expansible sealing gasket forced into its ultimate sealing condition.

When the gasket 45 is unstressed or in other words in its original condition the diameter thereof is such that the convexly curved bottom surface 46 bears only against the shoulder 48 to provide a continuous annular seal line in a circle of the annular shoulder 48 and is spaced above the shoulder 47 as shown in FIGS. 1 and 2. When the cap 30 is turned down tightly in the threaded counterbore 17 during assembly, however, the gasket 45 is caused to expand radially and also to roll downwardly and outwardly about the circle of contact between the convexly curved surface 46 and the shoulder 48 until the convexly curved surface 46 comes into contact with the annular shoulder 47 to provide a continuous annular seal line in a circle on the shoulder 47. A seal is also established between the curved bottom edge of the hollow shaft 31 of the cap 30 and the top surface of the gasket 45 so that three continuous annular seal lines are established. This condition is best shown in FIG. 3. Furthermore the axial force caused by turning the cap down tightly into the threaded counterbore 17 urges the seating element 20 firmly against the sealing gasket 40 to assure a tight seal between the bottom surface 21 of the seating element 20 and the floor 16 of the bore 15. This seal is assured because the force exerted on the gasket 45 is transmitted initially to the element 20 since the gasket 45 initially engages only the shoulder 48 and not the shoulder 47.

It will be apparent that the resulting relationship between the various parts and the seals provided can be achieved without maintaining highly accurate machining tolerances with respect to the respective surfaces on which the seals are established. Any variations in machining accuracy are readily compensated for by the resiliency of the gasket 45, particularly by virtue of its ability to radially expand to varying degrees at various circumferential locations therearound and to vary in the amount of its roll at various circumferential locations around the "wedge shaped" groove defined by the beveled surfaces 47 and 48.

During the operation of the trap the sealing disc 35 is moved by the action of the fluid passing through the trap from a position in which the disc 35 seats against the top surface 22 of the seating element 20 as shown in solid lines in FIG. 1 to a position at which it is spaced from the seating surfaces and wherein the central portion thereof is in contact with the stop 36 in the cap 30. After most of the condensate and air have passed through the trap the last portion thereof is at a temperature closely approaching the steam temperature of the system. Since the condensate is at such a high temperature there is a tendency for a portion thereof to flash into steam and this together with the kinetic energy of the fluid increases the fluid pressure acting against the top surface of the disc 35 until the total force acting against the top surface of the disc 35 becomes greater than the force acting on the bottom surface thereof and thereby the disc 35 is forced into contact with the top surface 22 of the seating element 20 to close the trap. Closing of the trap may even occur through the unit pressure in the chamber 32 may be less than the unit pressure in the system.

The disc 35 will remain in contact with the seating element 20 until the fluid pressure in the chamber 32 is reduced to the point that the force acting against the top surface of the disc is less than the effective force exerted against the bottom surface thereof. This reduction in pressure is largely the result of the heat energy transferred to the surrounding atmosphere and the fluid which escapes through the bleeder passage 39 connecting the annular groove 38 with the control chamber 32. The bleeder passage 39 is desirable to insure the opening and closing of the trap at sufficiently frequent intervals and prevention of possible trapping of air above the disc. The function and advantages obtained by the bleeder passage 39 are presented in more detail in U.S. Pat. No. 3,150,677 and form no part of the present invention.

While the invention has been illustrated and described with respect to a specific embodiment thereof this in intended for the purpose of illustration rather than limitation and other forms and modifications will be apparent to those skilled in the art upon a reading of the specification and appended claims. Wherefore the patent is not to be limited in any way that is inconsistent with the extent to which the progress in the art has been advanced by the invention.

I claim:

1. A seal for an annular joint between a body having a bore and a cylindrical element received in said bore and having a circular end face facing away from said bore, said seal comprising a beveled annular shoulder on said element at the edge of said circular end face and a beveled annular shoulder at the edge of said bore location adjacent to and slightly below and radially outward from said shoulder on said element, said shoulders defining with one another a V shaped groove, a radially expansible gasket having a convexly curved bottom surface that fits in said groove and that initially bears circumferentially only against said shoulder of said element when said gasket is in its original condition, and said gasket when forced downwardly into said groove being expanded and rolled downwardly and outwardly into sealing engagement with said beveled shoulder of said body to provide a continuous annular seal between said gasket and said body and another continuous seal between said gasket and said element.

2. A seal according to claim 1 having a gasket composed of steel.

3. A seal according to claim 2 wherein the top surface of the gasket is flat.

4. In a steam trap including a body having a sealed control chamber therein, a valve seating element secured within said body and having a circular end face within said control chamber, a port in said seating element opening into said control chamber, and valve means in said control chamber for controlling the opening and closing of said port, the improvement which comprises:

a beveled annular shoulder on said seating element at the edge of said circular end face, a beveled annular shoulder in said body located radially outward from and adjacent to and slightly below said shoulder in said seat element, said shoulders defining with one another a V shaped annular groove with the legs of the V slightly offset from one another, an annular, radially expansible gasket having a convexly curved bottom surface that fits in said groove and that initially bears circumferentially only against said shoulder of said seating element and is spaced from said shoulder in said body when said gasket is in its original condition, and means for forcing said gasket downwardly into said groove whereby said gasket is advanced downwardly and outwardly into sealing engagement with said beveled shoulder of said body to provide a continuous annular seal line between said gasket and said body and another continuous annular seal line between said gasket and said seating element.

5. A steam trap as defined in claim 4 wherein said gasket has a flat top surface and said bore has a threaded counterbore and wherein said means for forcing said gasket downwardly comprises a cap with a threaded hollow shaft received in said threaded counterbore and having a curved annular bottom edge that makes sealing engagement with the flat top surface of said gasket.

6. In a steam trap having a body with a bore with a threaded counterbore, a cylindrical valve seating element positioned in said bore, an annular sealing gasket between the bottom of said seating element and the floor of said bore, a cap with a hollow shaft threadedly received in said bore to define with said seat a control chamber, a first port in said seating element communicating with said control chamber and a second port in said seating element communicating with said control chamber and valve means in said control chamber for controlling the opening and closing of said ports, the improvement which comprises:

a convexly curved annular edge surface formed at the bottom of said cap, a beveled annular shoulder in said body between said bore and said counterbore, a beveled annular shoulder on said seating element adjacent said shoulder in said body being slightly below said shoulder on said seating element, said shoulders defining with one another a V shaped annular groove with the legs of the V slightly offset from one another, and an annular, radially expansible gasket with its top surface sealingly engageable by said annular edge and having a convexly curved bottom surface that rests against said shoulder on said seating element when said gasket is unexpanded and that advances downwardly and outwardly into sealing engagement with said shoulder of said body when said cap is tightened down, the force exerted by said radially expansible gasket on said seating element urging said seating element into sealing engagement with the said gasket that is disposed between the bottom of the seating element and the floor of said bore.

* * * * *